United States Patent
Liu et al.

(10) Patent No.: US 10,139,011 B2
(45) Date of Patent: Nov. 27, 2018

(54) SELF-HEAT-DISSIPATION PRESSURE-REDUCING VALVE

(71) Applicant: China University of Mining and Technology, Xuzhou, Jiangsu (CN)

(72) Inventors: Xiumei Liu, Jiangsu (CN); Beibei Li, Jiangsu (CN); Huawen Xu, Jiangsu (CN); Jie He, Jiangsu (CN); Bingyang Wang, Jiangsu (CN); Mingli Jiao, Jiangsu (CN); Fuhua Sun, Jiangsu (CN); Haibing Wang, Jiangsu (CN); Xiaochen Liu, Jiangsu (CN); Zhenzhen Dai, Jiangsu (CN); Zihao Xie, Jiangsu (CN)

(73) Assignee: China University of Mining and Technology, Xuzhou, Jiangsu (CN)

( * ) Notice: Subject to any disclaimer, the term of this patent is extended or adjusted under 35 U.S.C. 154(b) by 0 days.

(21) Appl. No.: 15/740,351

(22) PCT Filed: Nov. 4, 2016

(86) PCT No.: PCT/CN2016/104508
§ 371 (c)(1),
(2) Date: Dec. 28, 2017

(87) PCT Pub. No.: WO2018/068349
PCT Pub. Date: Apr. 19, 2018

(65) Prior Publication Data
US 2018/0238472 A1 Aug. 23, 2018

(30) Foreign Application Priority Data
Oct. 10, 2016 (CN) .......................... 2016 1 0884499

(51) Int. Cl.
*F16K 49/00* (2006.01)
*F16K 27/02* (2006.01)
*F16K 27/12* (2006.01)
*F16K 1/02* (2006.01)
(Continued)

(52) U.S. Cl.
CPC ................ *F16K 49/00* (2013.01); *F16K 1/02* (2013.01); *F16K 1/38* (2013.01); *F16K 1/42* (2013.01);
(Continued)

(58) Field of Classification Search
CPC ..... F16K 1/02; F16K 1/38; F16K 1/42; F16K 1/427; F16K 27/0254; F16K 27/12;
(Continued)

(56) References Cited

U.S. PATENT DOCUMENTS 880,569 A * 3/1908 Peulecke ................. F02B 67/04
123/198 C
905,745 A * 12/1908 Orr ........................ F16K 15/18
123/179.21
(Continued)

FOREIGN PATENT DOCUMENTS

CN  201159287  12/2008
CN  104653831   5/2015
(Continued)

*Primary Examiner* — R. K. Arundale
*Assistant Examiner* — Jonathan Waddy
(74) *Attorney, Agent, or Firm* — Winston Hsu

(57) ABSTRACT

A self-heat-dissipation pressure-reducing valve includes: a heat-dissipation valve core, an upper valve deck, a guiding valve deck, a valve body, a heat-dissipation valve seat, an air guide hood, and a turbine-type heat dissipation device. The heat-dissipation valve core is formed by a valve core composed of a heat pipe, and valve core heat-dissipation fins. The heat-dissipation valve seat includes a valve seat pocket, a valve seat shell, heat pipes, and valve seat heat-dissipation fins. An outer circumferential surface of the valve seat pocket is wound with multiple heat pipes fixed to the valve seat heat-dissipation fins. The turbine-type heat dissipation device includes a fan shell provided at a medium inlet, and a turbine. The turbine is lashed by a medium to turn the fan (Continued)

shell, and wind is guided in one direction through the external air guide hood to implement heat dissipation.

11 Claims, 13 Drawing Sheets

(51) Int. Cl.
*F16K 1/38* (2006.01)
*F16K 1/42* (2006.01)

(52) U.S. Cl.
CPC .......... *F16K 27/0254* (2013.01); *F16K 27/12* (2013.01); *Y10T 137/6525* (2015.04)

(58) Field of Classification Search
CPC .. F16K 49/00; F16K 49/002; Y10T 137/6416; Y10T 137/6525; Y10T 137/6606
USPC .......................................... 137/334, 338–341
See application file for complete search history.

(56) References Cited

U.S. PATENT DOCUMENTS

| | | | | | |
|---|---|---|---|---|---|
| 1,294,417 | A | * | 2/1919 | Dady | F02F 3/18 |
| | | | | | 123/188.9 |
| 2,550,418 | A | * | 4/1951 | MacDonald | F01D 17/145 |
| | | | | | 137/338 |

FOREIGN PATENT DOCUMENTS

| | | |
|---|---|---|
| CN | 204592370 | 8/2015 |
| JP | 2005048639 | 2/2005 |

\* cited by examiner

SELF-HEAT-DISSIPATION PRESSURE-REDUCING VALVE

BACKGROUND OF THE INVENTION

1. Field of the Invention

The present invention relates to a pressure-reducing valve, and in particular, to a self-heat-dissipation pressure-reducing valve applicable to petrochemical and coal-chemical equipment used in industrial and mining enterprises.

2. Description of Related Art

A high-pressure differential reducing valve is key equipment in petrochemical industry, coal-chemical industry, and so on. Because of particularities of industries such as coal-chemical industry, the pressure-reducing valve generally works in a large-caliber pipeline for conveying a high-temperature and high-pressure medium. Especially, in a coal liquefaction process, the high-pressure differential reducing valve relieves the pressure of a medium above 400° C. from 19 MPa to 2.8 MPa, where a peak flow speed of the medium reaches up to hectometers per second. Such a pressure-reducing valve is a valve used in the most demanding condition in the direct coal liquefaction process. Therefore, during operation, the pressure-reducing valve needs to bear not only a considerably high pressure, but also a thermal shock and a thermal load caused by a drastic temperature change in a short time. In use, the pressure-reducing valve may undergo creep, oxidation due to overheating, carburizing, corrosion, and so on, which shortens the service life of the valve. In addition, when the temperature of a fluid in the pressure-reducing valve is excessively high, the valve is unable to effectively dissipate the heat in a short time. Therefore, a throttle part of the valve may lose the pressure adjusting function due to cavitation, abrasion and so on. As a result, the operation of the device is affected, and the production and operation of the whole equipment are shut down, which reduce the production efficiency and cause huge economic losses. An existing patent with publication number CN204592370U proposes a heat-dissipation ball valve, where heat-dissipation fins are provided outside a valve stem to lower the temperature of the valve stem, thus preventing deformation of the valve stem, so that the valve can be smoothly turned on. A utility model with publication number CN203717961U proposes a new water-cooled high-temperature regulating butterfly valve, where a round spiral cooling-water channel is adopted to increase the use temperature of the valve. A patent with publication number CN104712843A proposes an air-cooled valve, where a cooling air cavity provided with a mazy air duct is disposed in a valve body, to enhance the heat conduction efficiency and lower the valve temperature. The prior art basically deals with heat dissipation of a valve by using heat-dissipation fins, or by means of water cooling or air cooling depending on external power, but fails to satisfactorily dissipate heat from a high-temperature and high-pressure medium. Moreover, the existing solutions all rely on external power to reduce the valve temperature, and cannot utilize the structure of valve itself to implement heat dissipation.

SUMMARY OF THE INVENTION

Technical Objective

To overcome the deficiencies of the prior art, the present invention provides a pressure-reducing valve which has a simple structure, achieves a desirable heat dissipation effect, and can implement heat dissipation by using its own structure.

Technical Means

To make up for the deficiencies of the prior art, the present invention provides a self-heat-dissipation pressure-reducing valve. The self-heat-dissipation pressure-reducing valve includes an air guide hood and a self-heat-dissipation pressure-reducing valve main body, where the self-heat-dissipation pressure-reducing valve main body includes a heat-dissipation valve core, an upper valve deck, a guiding valve deck, a valve body, a heat-dissipation valve seat, an inlet flange, and a turbine-type heat dissipation device.

The heat-dissipation valve core includes a valve core and valve core heat-dissipation fins, a head portion of the valve core being of a projecting tapered shape, external threads being provided on a middle section near the tail of the valve core, and the valve core heat-dissipation fins being fitted on the tail of the valve core and fixed by means of tin soldering.

The valve body is of a hollow three-way structure, the hollow heat-dissipation valve seat being provided below the valve body, and the guiding valve deck in which a stepped orifice is opened at its center being provided above the valve body; the upper valve deck is mounted at an opening on an upper portion of the guiding valve deck by using bolts, and the valve core is inserted into the valve body via a threaded through hole on the upper valve deck and is fastened to the upper valve deck by using the external threads; the turbine-type heat dissipation device is fitted on an inlet pipeline at a side of the valve body; and the inlet flange is fitted on the turbine-type heat dissipation device.

The heat-dissipation valve seat includes a valve seat pocket, a valve seat shell, heat pipes, and valve seat heat-dissipation fins, wherein a connection mechanism linked to the valve body is provided on the top of the valve seat shell, where four notches being opened on the connection mechanism; the valve seat pocket is disposed inside the valve seat shell, a shoulder on the top of the valve seat pocket works in conjunction with the lower end of the valve, and a stepped orifice matching the valve seat pocket being opened on the bottom of the valve seat shell; the valve seat heat-dissipation fins are disposed around an outer side of the valve seat shell; multi-threaded grooves are opened on an outer wall of the valve seat pocket, the heat pipes are wound around the multi-threaded grooves and fixed on the outer wall of the valve seat pocket and a gap between the valve seat pocket and the valve seat shell is filled with tin, and tail ends of the heat pipes are fixed on the valve seat heat-dissipation fins through the four notches on the valve seat shell respectively.

The tapered head portion of the valve core works in conjunction with the shoulder on the top of the heat-dissipation valve seat to form a pressure-reducing orifice.

The turbine-type heat dissipation device includes a fan shell and a turbine, the fan shell being of a hollow cylindrical structure with screw threads on both sides, fan blades being arranged on an outer side of the fan shell, a holder being provided inside the fan shell, and the turbine being disposed on the holder; and the threads on one side of the fan shell fasten a conical roller bearing to a pipeline of the valve body with a bearing inner ring retainer and a bearing outer ring retainer, and the threads on the other side fasten the conical roller bearing to the inlet flange with the bearing inner ring retainer.

The valve core is of a heat pipe structure made of carbon steel; the tail end of the valve core away from the upper valve deck is of a hexagonal structure; a wear resistant material is sprayed on the surface of the valve core; and the valve core heat-dissipation fins, as well as the valve seat heat-dissipation fins, made of copper or aluminum, are both of sunflower shape.

The threaded through hole is opened at the center of the upper valve deck and fits the external threads on the valve core, to adjust an opening degree of the pressure-reducing valve; a middle cavity between the upper valve deck and the guiding valve deck is filled with a sealant; and a top ring flange fits the guiding valve deck by using bolts to compress the sealant in the middle cavity.

The stepped orifice is opened at the center of the guiding valve deck, the lower hole diameter being slightly greater than the diameter of an outer wall of a cylindrical section of the valve core, and the upper hole diameter is equal to the diameter of an outer circumferential surface on a lower portion of the upper valve deck; a shoulder fitting a stepped orifice on an upper end of the valve body is arranged on the periphery of the guiding valve deck; and a ring flange on an upper portion of the shoulder is fixed on the valve body by using double-ended bolts, and the sealing rings are disposed at the fitting places between the ring flange and the valve body.

Openings at two ends of the valve body are stepped orifices; an inner cavity of the valve body is a spherical cavum; a groove is opened on an inner wall of an inlet pipeline at a side of the valve body where the fan shell is mounted; and the bearing outer ring retainer fits the inlet pipeline of the valve body by using bolts, to fasten an outer ring of the conical roller bearing inside the groove.

A stepped orifice matching the shoulder on the upper end of the valve seat pocket is disposed at the lower end of the valve body; the sealing rings are disposed at the fitting places between the lower end of the valve body and the valve seat pocket as well as between a bottom end of the valve seat pocket and the valve seat shell.

The lower hole diameter of the stepped orifice on the valve seat shell is equal to the diameter of a larger end of a conical bore at the bottom of the valve seat pocket; the upper hole diameter is slightly greater than the diameter of an outer wall of a whole body formed after the heat pipes which are wound around the valve seat pocket; and fan-shaped notches through which the heat pipes are drawn out are opened on a top ring flange, four heat pipes being provided.

The bearing inner ring retainer is formed by a cylindrical section and a conical section together; the cylindrical section is provided with pipe threads on an inner wall thereof and connected to the fan shell; and an outer wall of the conical section fits the inlet flange and the inlet of the valve body, and their fitting places are also sealed.

A front end of the turbine is provided with a fairing of a tapered structure used for reducing medium flow resistance, a middle part is provided with a key slot which fits a key to turn the fan shell, and a tail end is arranged with screws which fit a nut to ensure that the turbine is axially fastened; an angle of inclination of each turbine blade on the turbine and an angle of inclination of each blade on the fan shell are set so that when a fluid flows rightwards from the inlet flange and turns the turbine and the fan shell, the fan shell turns the fan to produce an airflow with a direction the same as that of the fluid inside the self-heat-dissipation pressure-reducing valve.

The air guide hood is formed by a left half casing and a right half casing that together envelop the self-heat-dissipation pressure-reducing valve main body; the left half casing and the right half casing are joined by using bolts; an inner diameter of a part of the air guide hood at the inlet pipeline of the self-heat-dissipation pressure-reducing valve main body is greater than an outer diameter of the blades on the fan shell; a support frame fitting the pressure-reducing valve main body is provided inside the air guide hood; a part of the air guide hood at the inlet of the valve body is of an arc structure for reducing an air flow loss; and a middle part of the air guide hood enveloping the valve body is of a hemispherical shape, and upper and lower ends are both necking structure.

The beneficial effects are as follows:

1. The valve core is formed by a heat pipe made of carbon steel, such that heat produced as the head portion of the valve core reduces the medium flow speed can be rapidly and effectively taken to the heat-dissipation fins of the valve core. The valve core and the heat-dissipation fins are soldered together by tin, thus enhancing heat conduction efficiency. A wear resistant material is coated on the outer surface of the valve core, thus increasing anti-erosion ability of the valve core.

2. The outer circumferential surface of the valve seat pocket is arranged with multi-threaded grooves; the heat pipes are separately wound in the threaded grooves and are drawn out through openings on the top of the valve seat shell, and are fixed to heat-dissipation fins on the valve seat by means of tin soldering, which speeds up heat dissipation of the valve seat. Gaps between inner hole surfaces of the valve seat shell, the heat pipes, and the outer circumferential surface of the valve seat pocket are filled with tin, thus enhancing integrity and pressure resistance of the valve seat, and improving the heat transfer efficiency between the valve seat pocket and the heat pipes.

3. The turbine-type heat dissipation device is mounted at the inlet of the valve body by using a conical roller bearing. The medium lashes the turbine to turn the fan shell through the conical roller bearing. The wind produced by the rotation of the fan blades on the fan shell is guided by the air guide hood to facilitate the heat dissipation of the heat-dissipation fins on the valve core and the valve seat. In this way, the pressure-reducing valve can dissipate heat by itself, and produce wind energy for heat dissipation under the medium pressure.

4. The medium lashes the internal fan to turn, and the turbine consumes kinetic energy of the medium. That is, pressure reduction is achieved at the inlet of the valve body, and the pressure at the throttle part of the valve is shared, thus reducing cavitation damage to the valve core and the valve seat pocket, prolonging the service life of the valve, and reducing maintenance and repair costs.

In the accompanying drawings: 1. Heat-dissipation valve core, 2. Upper valve deck, 3. Guiding valve deck, 4. Valve body, 5. Heat-dissipation valve seat, 6. Air guide hood, 7. Inlet flange, 8. Turbine-type heat dissipation device, 9. Bearing inner ring retainer, 10. Conical roller bearing, 11. Bearing outer ring retainer, 12. Valve core, 13. Valve core heat-dissipation fin, 14. Valve seat pocket, 15. Valve seat shell, 16. Heat pipe, 17. Valve seat heat-dissipation fin, 18. Fan shell, and 19. Turbine.

DETAILED DESCRIPTION OF THE INVENTION

Figure 1:
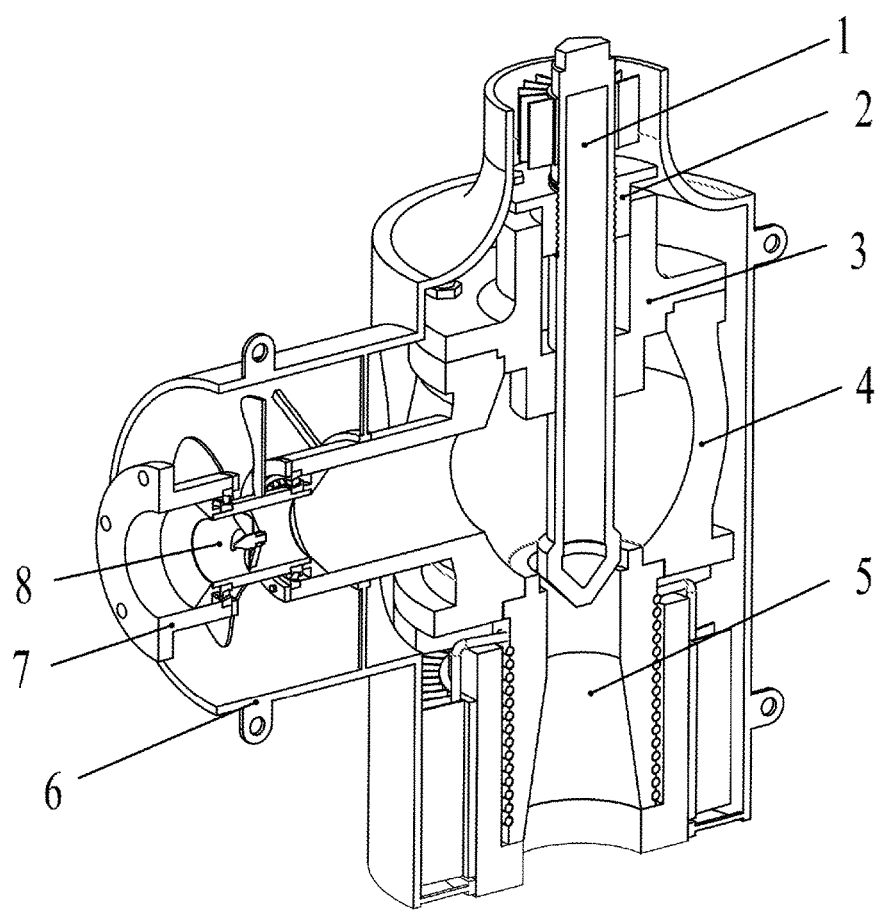
FIG. 1 is an axonometric diagram of a profile of a self-heat-dissipation pressure-reducing valve according to the present invention.
Figure 2:
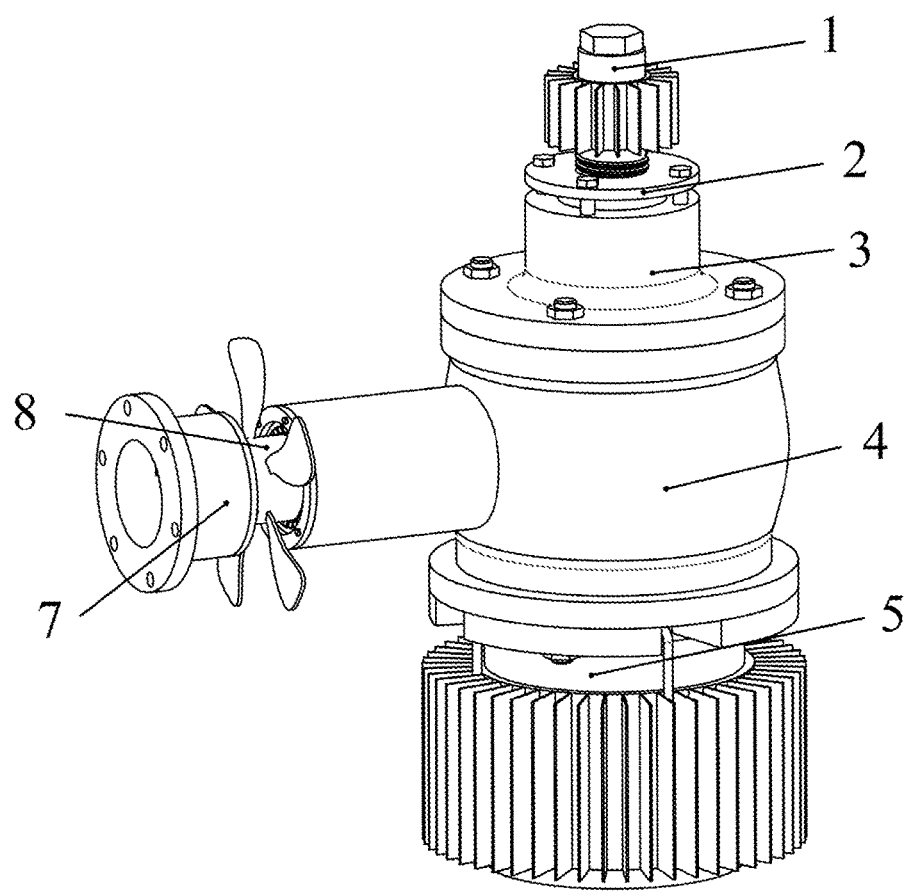
FIG. 2 is an axonometric diagram of a self-heat-dissipation pressure-reducing valve main body in the present invention.

The embodiment of the present invention is further described in detail below with reference to the accompanying drawings:

As shown in FIG. 1 and FIG. 2, a self-heat-dissipation pressure-reducing valve of the present invention includes an air guide hood 6 and a self-heat-dissipation reducing valve main body. The self-heat-dissipation pressure-reducing valve main body includes a heat-dissipation valve core 1, an upper valve deck 2, a guiding valve deck 3, a valve body 4, a heat-dissipation valve seat 5, an inlet flange 7, and a turbine-type heat dissipation device 8.

Figure 5:
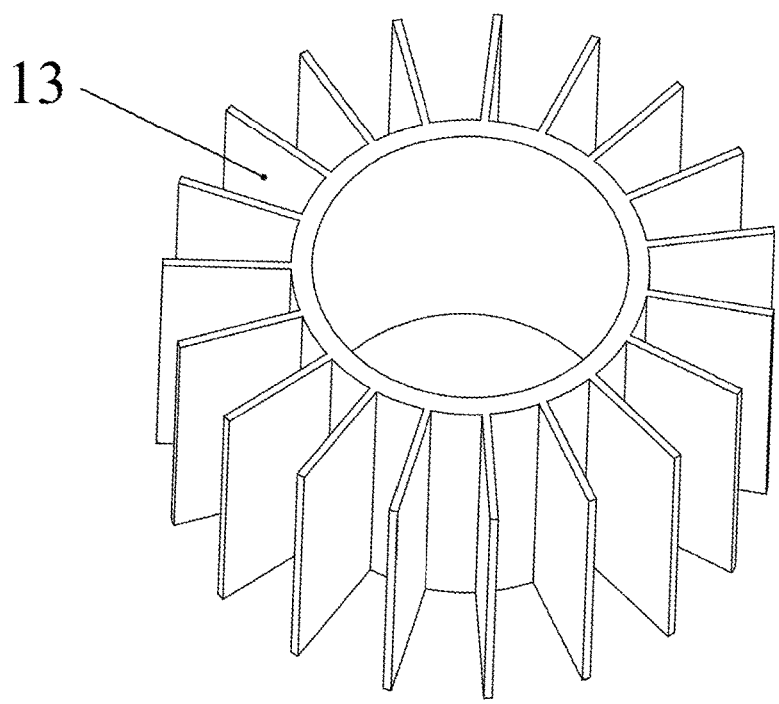
FIG. 5 is a structural diagram of valve core heat-dissipation fins of the self-heat-dissipation pressure-reducing valve according to the present invention.

As shown in FIG. 5, the heat-dissipation valve core 1 includes a valve core 12 and valve core heat-dissipation fins 13. A head portion of the valve core 12 is of a projecting tapered shape, external threads are provided on a middle section near the tail of the valve core 12, and the valve core heat-dissipation fins 13 are fitted on the tail of the valve core 12 and fixed by means of tin soldering. The valve core 12 is of a heat pipe structure made of carbon steel. The tail of the valve core 12 away from the upper valve deck 2 is of a hexagonal structure. A wear resistant material is sprayed on the surface of the valve core 12. The valve core heat-dissipation fins 13, as well as the valve seat heat-dissipation fins 17, made of copper or aluminum, both are of sunflower shape.

The valve body 4 is of a hollow three-way structure. The hollow heat-dissipation valve seat 5 is provided below the valve body 4, and the guiding valve deck 3 in which a stepped orifice is opened at its center is provided above the valve body 4. The upper valve deck 2 is mounted at an opening on an upper portion of the guiding valve deck 3 by using bolts. The heat-dissipation valve spool 1 is inserted into the valve body 4 via external threads on the upper valve deck 2 and is fastened to the upper valve deck 2 by using the external threads on the valve spool core 12. The threaded through hole is opened at the center of the upper valve deck 2 and fits the external threads on the valve core 12, to adjust an opening degree of the pressure-reducing valve. A middle cavity between the upper valve deck 2 and the guiding valve deck 3 is filled with a sealant. A top ring flange fits the guiding valve deck by using bolts to compress the sealant in the middle cavity. The stepped orifice is opened at the center of the guiding valve deck 3, where the lower hole diameter is slightly greater than the diameter of an outer wall of a cylindrical section of the valve core 12, and the upper hole diameter is equal to the diameter of an outer circumferential surface on a lower portion of the upper valve deck 2. A shoulder fitting a stepped orifice on an upper end of the valve body 4 is arranged on the periphery of the guiding valve deck 3. A ring flange on an upper portion of the shoulder is fixed on the valve body 4 by using double-ended bolts, and the sealing rings are disposed at the fitting places between the ring flange and the valve body 4.

Figure 3:
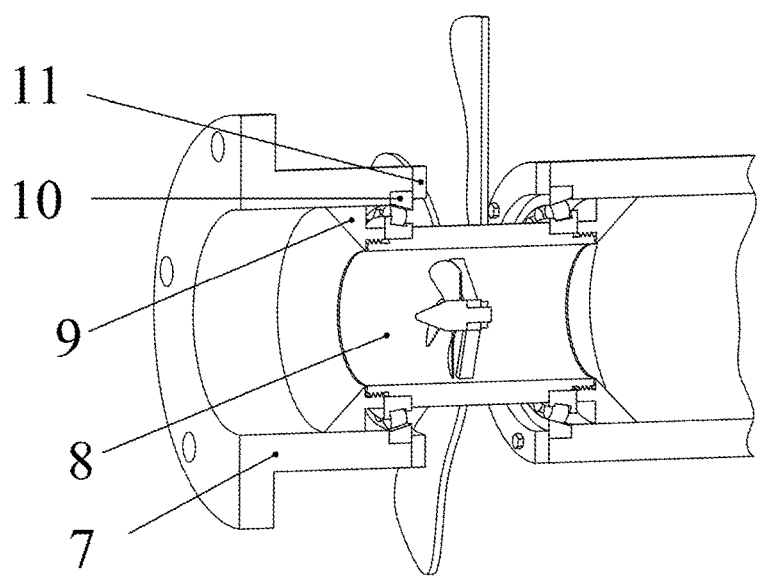
FIG. 3 is a partial enlarged diagram of an inlet of a valve body of the self-heat-dissipation pressure-reducing valve according to the present invention.
Figure 4:
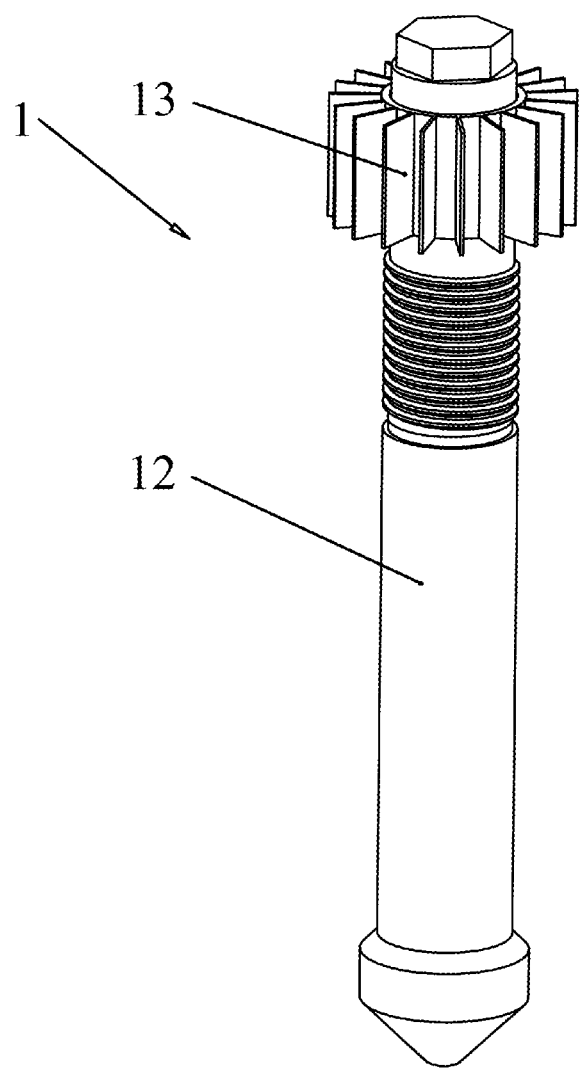
FIG. 4 is a structural diagram of a heat-dissipation valve core of the self-heat-dissipation pressure-reducing valve according to the present invention.
Figure 10:
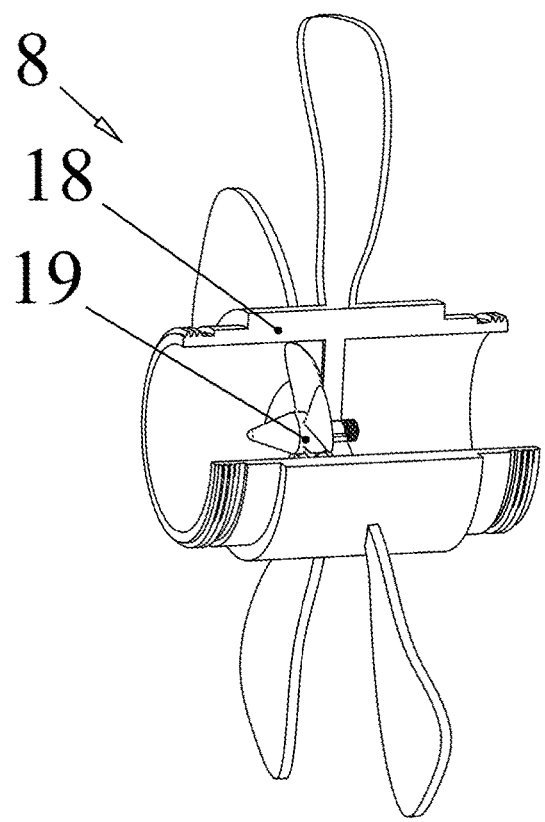
FIG. 10 is a structural diagram of a turbine-type heat dissipation device of the self-heat-dissipation pressure-reducing valve according to the present invention.
Figure 11:
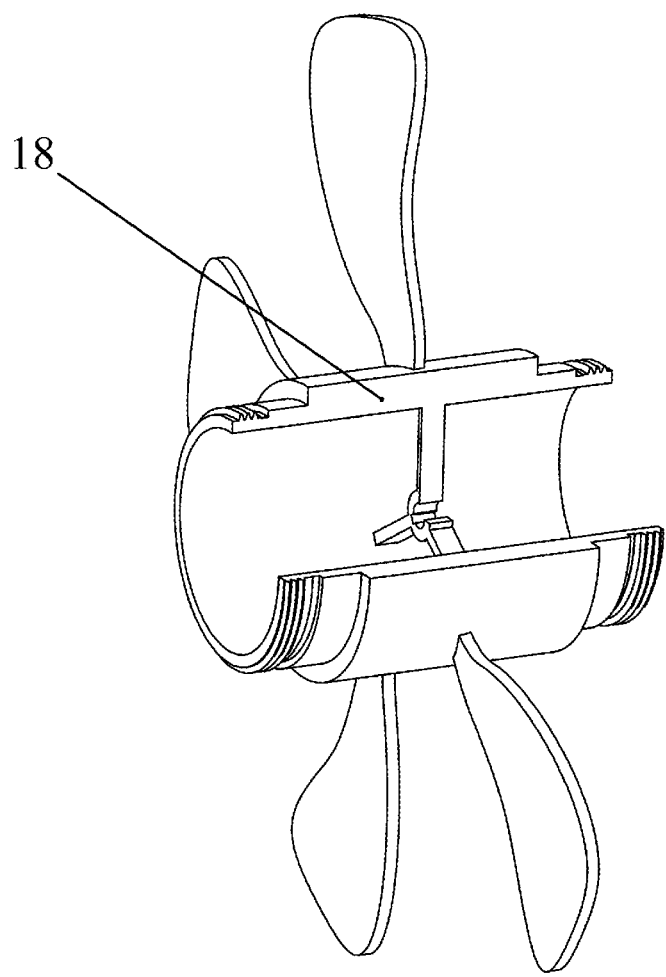
FIG. 11 is a structural diagram of a fan shell of the self-heat-dissipation pressure-reducing valve according to the present invention.
Figure 12:
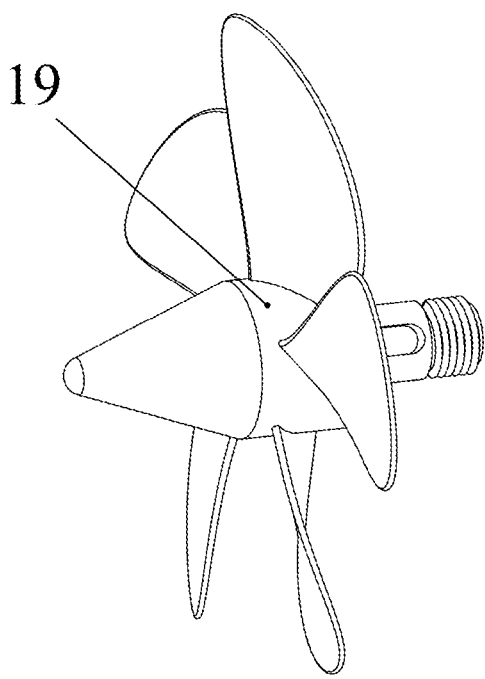
FIG. 12 is a structural diagram of a turbine of the self-heat-dissipation pressure-reducing valve according to the present invention.

As shown in FIG. 3, the turbine-type heat dissipation device 8 is provided on an inlet pipeline at a side of the valve body 4, and the inlet flange 7 is provided on the turbine-type heat dissipation device 8. As shown in FIGS. 10, 11, and 12, a front end of the turbine 19 is provided with a fairing of a tapered structure used for reducing medium flow resistance, a middle part is provided with a key slot which fits a key to turn the fan shell 18, and a tail end is arranged with threads which fit a nut to ensure that the turbine 19 is axially fastened. An angle of inclination of each turbine blade on the turbine 19 and an angle of inclination of each fan blade on the fan shell are set so that when a fluid flows rightwards from the inlet flange 7 and turns the turbine and the fan shell, the fan shell turns the fan to produce an airflow with a direction the same as that of the fluid inside the self-heat-dissipation pressure-reducing valve.

Figure 9:
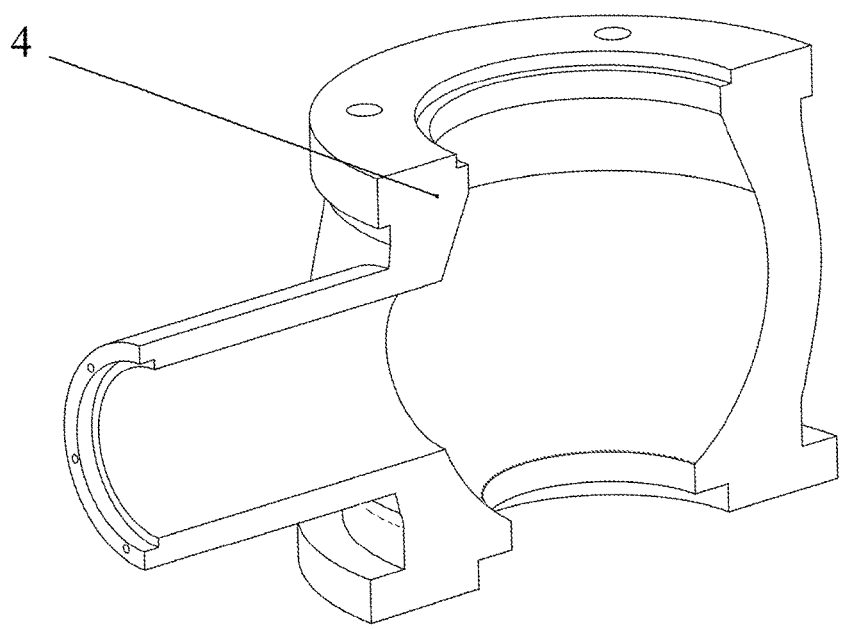
FIG. 9 is a structural diagram of the valve body of the self-heat-dissipation pressure-reducing valve according to the present invention.

As shown in FIG. 9, openings at two ends of the valve body 4 are stepped orifices, and an inner cavity of the valve body 4 is a spherical cavity. A groove is opened on an inner wall of an inlet pipeline at a side of the valve body 4 where the fan shell 18 is mounted. A bearing outer ring retainer 11 fits the inlet pipeline of the valve body 4 by using bolts, to fasten an outer ring of a conical roller bearing 10 inside the groove.

Figure 6:
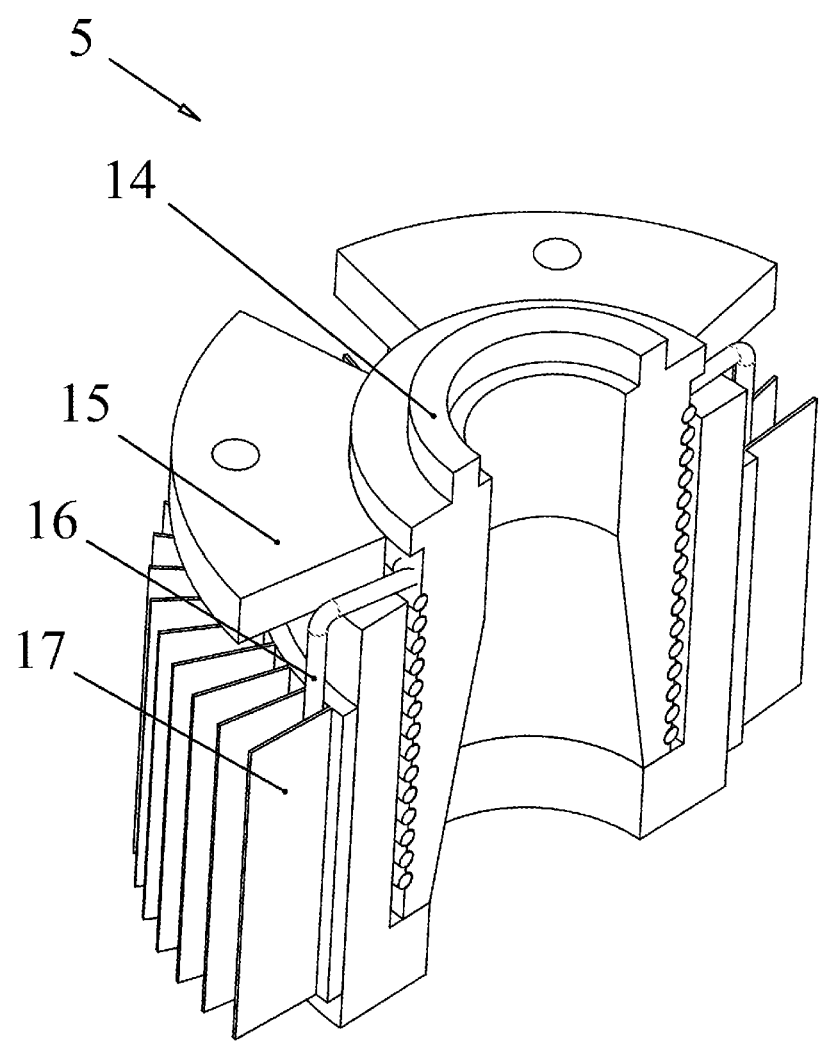
FIG. 6 is a structural diagram of a heat-dissipation valve seat of the self-heat-dissipation pressure-reducing valve according to the present invention.
Figure 7:
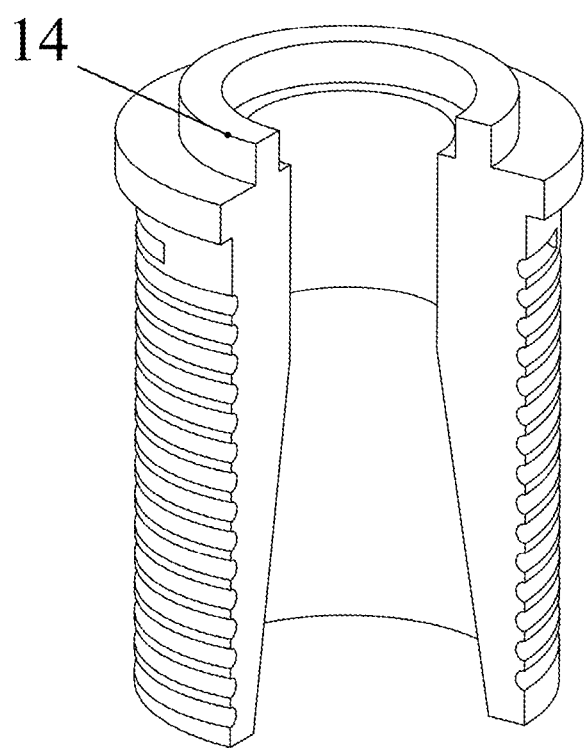
FIG. 7 is a structural diagram of a valve seat pocket of the self-heat-dissipation pressure-reducing valve according to the present invention.
Figure 8:
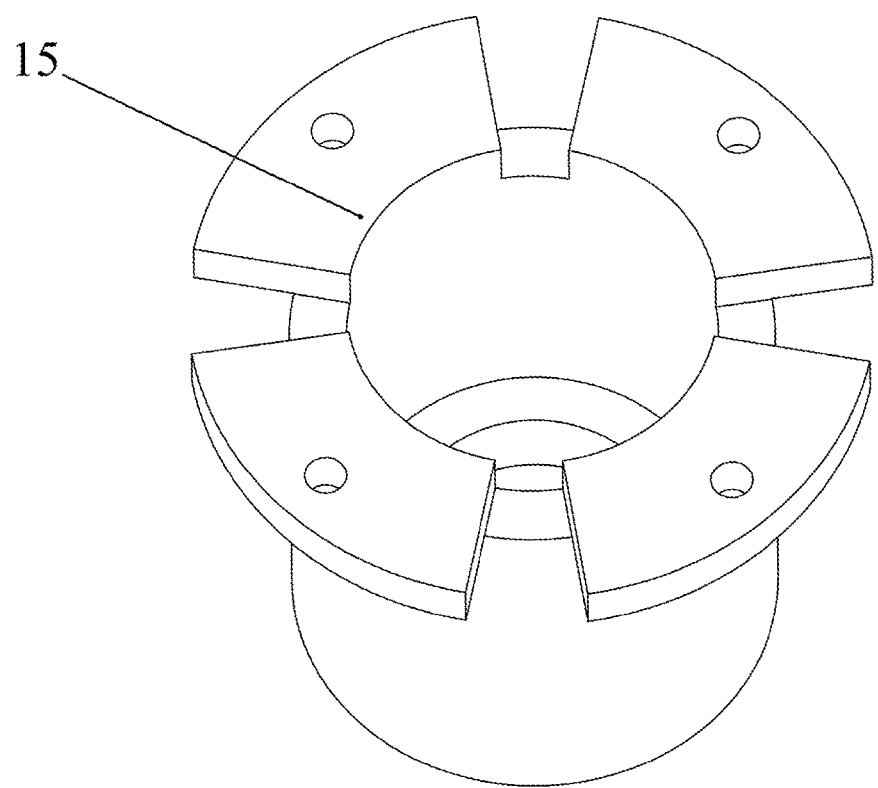
FIG. 8 is a structural diagram of a valve seat shell of the self-heat-dissipation pressure-reducing valve according to the present invention.

As shown in FIG. 6, the heat-dissipation valve seat 5 includes a valve seat pocket 14, a valve seat shell 15, heat pipes 16, and valve seat heat-dissipation fins 17. A connection mechanism linked to the valve body 4 is provided on the top of the valve seat shell 15, and four notches are opened on the connection mechanism. The valve seat pocket 14 is disposed inside the valve seat shell 15, a shoulder on the top of the valve seat pocket 14 cooperates with the lower end of the valve body 4, and a stepped orifice matching the valve seat pocket 14 is opened on the bottom of the valve seat shell 15. As shown in FIG. 7 and FIG. 8, the valve seat heat-dissipation fins 17 are disposed around an outer side of the valve seat shell 15. Multi-threaded grooves are opened on an outer wall of a side of the valve seat pocket, and the heat pipes 16 are wound around the multi-threaded grooves and fixed on the outer wall of the valve seat pocket. A gap between the valve seat pocket 14 and the valve seat shell 15 is filled with tin. Tail ends of the heat pipes 16 are fixed on the valve seat heat-dissipation fins 17 through the four notches on the valve seat shell 15 respectively. A stepped orifice matching the shoulder on the upper end of the valve seat pocket 14 is disposed at the lower end of the valve body 4. The sealing rings are disposed between the lower end of the valve body 4 and the valve seat pocket 14 as well as between a bottom end of the valve seat pocket 14 and the valve seat shell 15.

The tapered head portion of the valve core 12 works in conjunction with the shoulder on the top of the heat-dissipation valve seat 5 to form a pressure-reducing orifice.

The turbine-type heat dissipation device 8 includes a fan shell 18 and a turbine 19. The fan shell 18 is of a hollow cylindrical structure with external threads on both sides, fan blades are arranged on an outer side of the fan shell 18, a holder is provided inside the fan shell 18, and the turbine 19 is disposed on the holder. A conical roller bearing 10 is fitted in the pipeline of the valve body 4 by means of the external threads on one side of the fan shell 18 and a bearing inner ring retainer 9 and a bearing outer ring retainer 11, while a conical roller bearing 10 is fitted in the inlet flange 7 by means of the external threads on the other side and a bearing inner ring retainer 9. The bearing inner ring retainer 9 is formed by a cylindrical section and a conical section together. The cylindrical section is provided with pipe threads on an inner wall thereof and connected to the fan shell 18; and an outer wall of the conical section fits the inlet flange 7 and the inlet of the valve body, and their fitting places are also sealed.

Figure 13:
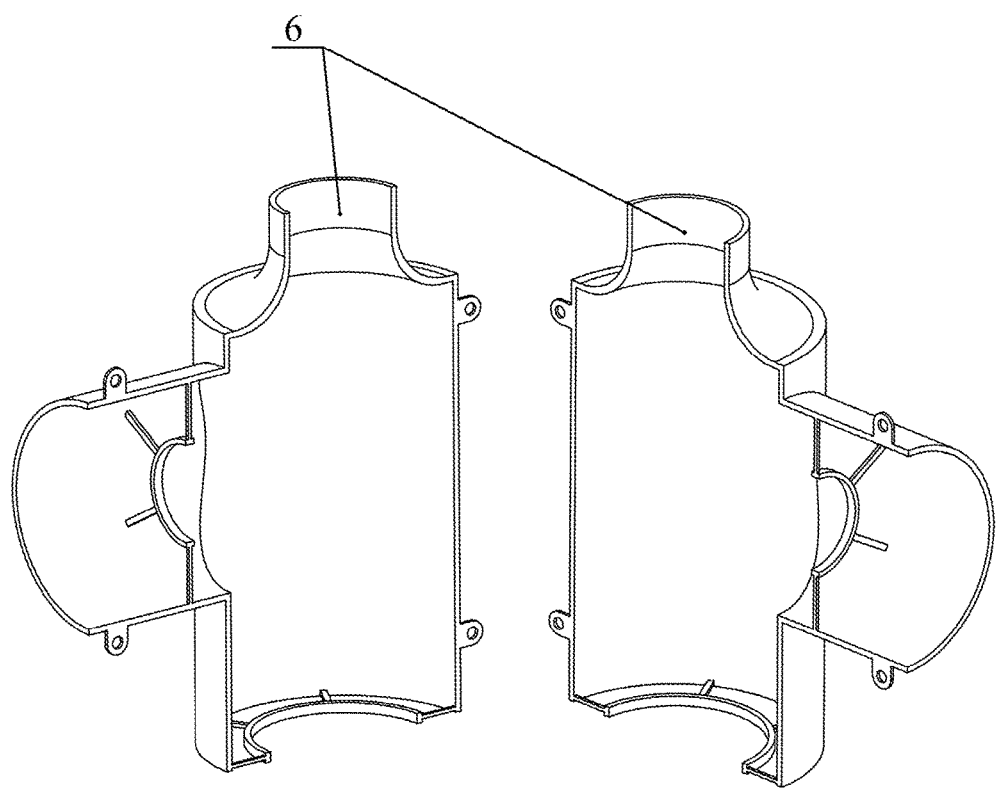
FIG. 13 is a structural diagram of an air guide hood of the self-heat-dissipation pressure-reducing valve according to the present invention.

As shown in FIG. 13, the air guide hood 6 is formed by a left half casing and a right half casing which together envelop the self-heat-dissipation pressure-reducing valve main body. The left half casing and the right half casing are joined by using bolts. An inner diameter of a part of the air guide hood 6 at the inlet pipeline of the self-heat-dissipation pressure-reducing valve main body is greater than an outer diameter of the blades on the fan shell 18. A support frame fitting the pressure-reducing valve main body is provided inside the air guide hood 6. A part of the air guide hood 6 at the inlet of the valve body is of an arc structure for reducing an air flow loss. A middle part of the air guide hood 6 enveloping the valve body is of a hemispherical shape, and upper and lower ends are both necking structures.

What is claimed is:

1. A self-heat-dissipation pressure-reducing valve, comprising an air guide hood (6) and a self-heat-dissipation pressure-reducing valve main body, wherein the self-heat-dissipation pressure-reducing valve main body comprises a heat-dissipation valve core (1), an upper valve deck (2), a guiding valve deck (3), a valve body (4), a heat-dissipation valve seat (5), an inlet flange (7), and a turbine-type heat dissipation device (8);

the heat-dissipation valve core (1) comprises a valve core (12) and valve core heat-dissipation fins (13), a head portion of the valve core (12) being of a projecting tapered shape, external threads being provided on a middle section near a tail of the valve core (12), and the valve core heat-dissipation fins (13) being fitted on the tail of the valve core (12) and fixed by means of tin soldering;

the valve body (4) is of a hollow three-way structure, the hollow heat-dissipation valve seat (5) being provided below the valve body (4), and the guiding valve deck (3), in which a stepped orifice is opened at a center of the guiding valve deck (3), being provided above the valve body (4); the upper valve deck (2) is mounted at an opening on an upper portion of the guiding valve deck (3) by bolts, and the vale core (12) is inserted into the valve body (4) via a threaded through hole on the upper valve deck (2) and is fastened to the upper valve deck (2) by the external threads; the turbine-type heat dissipation device (8) is fitted on an inlet pipeline at a side of the valve body (4); and the inlet flange (7) is fitted on the turbine-type heat dissipation device (8);

the heat-dissipation valve seat (5) comprises a valve seat pocket (14), a valve seat shell (15), heat pipes (16), and valve seat heat-dissipation fins (17), wherein a connection mechanism linked to the valve body (4) is provided on a top of the valve seat shell (15), where four notches are opened on the connection mechanism; the valve seat pocket (14) is disposed inside the valve seat shell (15), a shoulder on a top of the valve seat pocket (14) works in conjunction with a lower end of the valve body (4) and a stepped orifice matching the valve seat pocket (14) being opened on a bottom of the valve seat shell (15); the valve seat heat-dissipation fins (17) are disposed around an outer side of the valve seat shell (15); multi-threaded grooves are opened on an outer wall of the valve seat pocket, the heat pipes (16) are wound around the multi-threaded grooves and then fixed on the outer wall of the valve seat pocket, a gap between the valve seat pocket (14) and the valve seat shell (15) is filled with tin, and tail ends of the heat pipes (16) are fixed on the valve seat heat-dissipation fins (17) through the four notches on the valve seat shell (15) respectively;

the tapered head portion of the valve core (12) works in conjunction with the shoulder on the top of the valve seat pocket (14) to form a pressure-reducing orifice;

the turbine-type heat dissipation device (8) comprises a fan shell (18) and a turbine (19), the fan shell (18) being of a hollow cylindrical structure with external threads on both sides, fan blades being arranged on an outer side of the fan shell (18), a holder being supplied inside the fan shell (18), and the turbine (19) being disposed on the holder; and a conical roller bearing (10) is fitted in the inlet pipeline of the valve body (4) by means of the external threads on one side of the fan shell (18) and a bearing inner ring retainer (9) and a bearing outer ring retainer (11), while a conical roller bearing (10) is fitted in the inlet flange (7) by means of the external threads on the other side of the fan shell and a bearing inner ring retainer (9).

2. The self-heat-dissipation pressure-reducing valve according to claim 1, wherein the valve core (12) is of a heat pipe structure made of carbon steel; the tail end of the valve core (12) located away from the upper valve deck (2) is of a hexagonal structure; a wear resistant material is sprayed on a surface of the valve core (12); and the valve core heat-dissipation fins (13), as well as the valve seat heat-dissipation fins (17), made of copper or aluminum, are both of sunflower shape.

3. The self-heat-dissipation pressure-reducing valve according to claim 1, wherein the threaded through hole is opened at a center of the upper valve deck (2) and fits the external threads on the valve core (12), to adjust an opening degree of the pressure-reducing valve; a middle cavity between the upper valve deck (2) and the guiding valve deck (3) is filled with a sealant; and a top ring flange fits the guiding valve deck by using bolts to compress the sealant in the middle cavity.

4. The self-heat-dissipation pressure-reducing valve according to claim 1, wherein the stepped orifice of the guiding valve deck (3) is opened at the center of the guiding valve deck (3), a diameter of a lower hole of the guiding valve deck (3) is slightly greater than a diameter of an outer wall of a cylindrical section of the valve core (12), and a diameter of an upper hole of the guiding valve deck (3) is equal to a diameter of an outer circumferential surface on a lower portion of the upper valve deck (2); a shoulder fitting a stepped orifice on an upper end of the valve body (4) is arranged on the periphery of the guiding valve deck (3); and a ring flange on an upper portion of the shoulder of the guiding valve deck (3) is fixed on the valve body (4) by using double-ended bolts, and sealing rings are disposed at fitting places between the ring flange and the valve body (4).

5. The self-heat-dissipation pressure-reducing valve according to claim 1, wherein openings at two ends of the valve body (4) are stepped orifices; an inner cavity of the valve body (4) is a spherical cavum; a groove is opened on an inner wall of the inlet pipeline at the side of the valve body (4) where the fan shell (18) is mounted; and the bearing outer ring retainer (11) fits the inlet pipeline of the valve body (4) by using bolts, to fasten an outer ring of the conical roller bearing (10) inside the groove.

6. The self-heat-dissipation pressure-reducing valve according to claim 1, wherein a stepped orifice matching the shoulder on the upper end of the valve seat pocket (14) is disposed at the lower end of the valve body (4); sealing rings are disposed at the fitting places between the lower end of the valve body (4) and the valve seat pocket (14) as well as between a bottom end of the valve seat pocket (14) and the valve seat shell (15).

7. The self-heat-dissipation pressure-reducing valve according to claim 1, wherein a diameter of a lower hole of the stepped orifice on the valve seat shell (15) is equal to a diameter of a larger end of a conical bore at a bottom of the valve seat pocket (14); a diameter of an upper hole of the stepped orifice on the valve seat shell (15) is slightly greater than a diameter of an outermost extent of the heat pipes (16) wound around the valve seat pocket (14); and the notches through which the heat pipes (16) are drawn out are opened on a top ring flange, four heat pipes (16) being provided.

8. The self-heat-dissipation pressure-reducing valve according to claim 1, wherein both the bearing inner ring retainer (9) associated with the inlet flange (7) and the bearing inner ring retainer (9) associated with the inlet pipeline of the valve body are formed by a cylindrical section and a conical section; each cylindrical section is provided with pipe threads on an inner wall thereof and connected to the fan shell (18); and an outer wall of the conical section of the bearing inner ring retainer (9) associated with the inlet flange (7) fits the inlet flange (7) in a sealed manner, an outer wall of the conical section of the bearing inner ring retainer (9) associated with the inlet pipeline of the valve body fits the inlet pipeline of the valve body in a sealed manner.

9. The self-heat-dissipation pressure-reducing valve according to claim 1, wherein a front end of the turbine (19) is provided with a fairing of a tapered structure used for reducing medium flow resistance, a middle part is provided with a key slot which fits a key to turn the fan shell (18), and a tail end is arranged with screws which fit a nut to ensure that the turbine (19) is axially fastened; an angle of inclination of each turbine blade on the turbine (19) and an angle of inclination of each blade on the fan shell are set so that when a fluid flows rightwards from the inlet flange (7) and turns the turbine and the fan shell, the fan shell turns the fan to produce an airflow with a direction the same as that of the fluid inside the self-heat-dissipation pressure-reducing valve.

10. The self-heat-dissipation pressure-reducing valve according to claim 9, wherein the air guide hood (6) is formed by a left half casing and a right half casing that together envelop the self-heat-dissipation pressure-reducing valve main body; the left half casing and the right half casing are joined by bolts; an inner diameter of a part of the air guide hood (6) at the inlet pipeline of the self-heat-dissipation pressure-reducing valve main body is greater than an outer diameter of the blades on the fan shell (18); a support frame fitting the pressure-reducing valve main body is provided inside the air guide hood (6); a part of the air guide hood (6) at an inlet of the valve body (4) is of a cylindrical structure; and a middle part of the air guide hood (6) enveloping the valve body (4) is of a hemispherical shape, and upper and lower ends of the air guide hood (6) are both necking structures.

11. The self-heat-dissipation pressure-reducing valve according to claim 1, wherein the air guide hood (6) is formed by a left half casing and a right half casing that together envelop the self-heat-dissipation pressure-reducing valve main body; the left half casing and the right half casing are joined by bolts; an inner diameter of a part of the air guide hood (6) at the inlet pipeline of the self-heat-dissipation pressure-reducing valve main body is greater than an outer diameter of the blades on the fan shell (18); a support frame fitting the pressure-reducing valve main body is provided inside the air guide hood (6); a part of the air guide hood (6) at an inlet of the valve body (4) is of a cylindrical structure; and a middle part of the air guide hood (6) enveloping the valve body (4) is of a hemispherical shape, and upper and lower ends of the air guide hood (6) are both necking structures.

\* \* \* \* \*